(12) United States Patent
Yang (10) Patent No.: US 11,178,140 B2
(45) Date of Patent: Nov. 16, 2021

(54) METHOD, DEVICE AND SYSTEM FOR AUTHENTICATION IN ACCORDANCE WITH SIM CARD

(71) Applicant: SHANGHAI HARVEST INTELLIGENCE TECHNOLOGY CO., LTD, Shanghai (CN)

(72) Inventor: Gan Yang, Shanghai (CN)

( * ) Notice: Subject to any disclaimer, the term of this patent is extended or adjusted under 35 U.S.C. 154(b) by 0 days.

(21) Appl. No.: 16/708,447

(22) Filed: Dec. 10, 2019

(65) Prior Publication Data

US 2020/0186521 A1 Jun. 11, 2020

(30) Foreign Application Priority Data

Dec. 11, 2018 (CN) .......................... 201811510785.1

(51) Int. Cl.
| | |
|---|---|
| *H04L 29/06* | (2006.01) |
| *H04W 12/30* | (2021.01) |
| *H04W 12/72* | (2021.01) |
| *H04L 9/08* | (2006.01) |
| *G06K 19/07* | (2006.01) |

(Continued)

(52) U.S. Cl.
CPC ...... *H04L 63/0853* (2013.01); *G06K 9/00885* (2013.01); *G06K 9/00986* (2013.01); *G06K 19/0723* (2013.01); *H04L 9/0869* (2013.01); *H04L 9/3231* (2013.01); *H04L 9/3271* (2013.01); *H04L 63/0861* (2013.01); *H04W 12/30* (2021.01); *H04W 12/35* (2021.01); *H04W 12/72* (2021.01); *H04L 63/0442* (2013.01); *H04L 2209/80* (2013.01)

(58) Field of Classification Search
CPC ............ H04L 63/0853; H04L 63/0861; H04L 9/0869; H04L 9/3271; H04L 9/3231; H04L 2209/80; G06K 19/0723; G06K 9/00597; G06K 9/00604; G06K 9/0061; G06K 9/00986; G06K 9/00885; H04W 12/00514; H04W 12/002; H04W 12/0023
USPC ........................ 382/115–117; 455/410, 414.1
See application file for complete search history.

(56) References Cited

U.S. PATENT DOCUMENTS

| | | | | |
|---|---|---|---|---|
| 2005/0175223 | A1* | 8/2005 | Nordin | ............... G06K 9/00087 382/124 |
| 2012/0322410 | A1* | 12/2012 | Lodeweyckx | ........ H04W 12/06 455/411 |

(Continued)

*Primary Examiner* — Michael Y Mapa (57) ABSTRACT

A method, device and system for authentication in accordance with a SIM card is provided in the present disclosure. The method for authentication in accordance with the SIM card includes the following steps. First, the SIM card receives a feature code of a biometric feature information. Afterwards, the SIM card compares the feature code of the biometric feature information and a feature code stored in the SIM card for obtaining a comparison result. Afterwards, the SIM card returns the comparison result. Compared to existing technology, the above technical solution is configured to store the feature code in the SIM card and use it for authentication. The noncrackable SIM card protects a security of biometric feature information. After replacing the device, just plug the SIM card into the new device to complete the authentication and initialization of the new device. Therefore, the above technical solution avoids the initial setup of the new device and make it easy to use.

11 Claims, 6 Drawing Sheets

(51) Int. Cl.
  *H04L 9/32* (2006.01)
  *G06K 9/00* (2006.01)

(56) References Cited

U.S. PATENT DOCUMENTS

2020/0004941 A1* 1/2020 Weber ................. G06F 21/6209
2020/0050828 A1* 2/2020 Li ........................... G06T 5/002

* cited by examiner

METHOD, DEVICE AND SYSTEM FOR AUTHENTICATION IN ACCORDANCE WITH SIM CARD

FIELD OF THE DISCLOSURE

The present disclosure relates to a field of cryptographic authentication, more particularly to an authentication method, device and system in accordance with a SIM card.

BACKGROUND OF THE INVENTION

The biometric technologies are a close combination of high-tech means such as computers, optics, acoustics, biosensor and biometric principles. It utilizes the inherent physiological (e.g., fingerprints, human face, iris) and behavioral characteristics (e.g., handwriting, sound, gait) of the human body to identify personal identity. After that, the comparison is performed to verify the identity. Fingerprint authentication currently has the largest proportion in the biometric technologies.

Human characteristics are unique and unrepeatable. This biological key cannot be copied, stolen or forgotten. It is safe, reliable and accurate to carry out identity authentication by the biometric technologies. Passwords, IC cards, barcodes, magnetic cards or keys are at risk of being lost, forgotten, duplicated, and stolen. Therefore, it is not necessary to carry a large string of keys. Therefore, the use of biometric feature information eliminates the need to carry a large string of keys and the need to worry about remembering or changing passwords. The products of the biometric technologies are realized with the help of modern computer technology, so it is easy to cooperate with the integration of computers and security, monitoring and management systems to achieve automatic management.

The current problem is that after replacing a new mobile phone or other electronic device, the users need to reset a biometric feature information such as fingerprints or human face to the mobile phone. Only in this way can the new mobile phone be fingerprinted or identified, which causes inconvenience in use.

SUMMARY OF THE INVENTION

Therefore, it is necessary to provide an authentication method, device and system in accordance with a SIM card to solve the problem with recertification after replacing a new electronic device.

To achieve the above object, an authentication method in accordance with a SIM card is provided. The authentication method in accordance with the SIM card includes the following steps. First, the SIM card receives a feature code of a biometric feature information. Afterwards, the SIM card compares the feature code of the biometric feature information and a feature code stored in the SIM card for obtaining a comparison result. Afterwards, the SIM card returns the comparison result.

In some embodiment, the authentication method further includes the following steps before the SIM card receives the feature code of the biometric feature information. First, the SIM card receives a random number request. Afterwards, the SIM card returns a random number in accordance with the random number request. Afterwards, the SIM card receiving the feature code of the biometric feature information and the SIM card comparing the feature code of the biometric feature information and a feature code stored in the SIM card further includes: the SIM card receiving 1a random number and the feature code of the biometric feature information, the SIM card comparing the random number and the feature code of the biometric feature information and the random number and the feature code stored in the SIM card.

In some embodiment, the SIM card comparing the feature code of the biometric feature information and the feature code stored in the SIM card includes the following steps. First, the SIM card transmits a SIM card identification code through a radio-frequency module to a base station for authentication. Afterwards, the SIM card receives an authentication result of the base station. Afterwards, if the authentication result is passed, the SIM card is configured to compare, and if the authentication result is not passed, the SIM card is not configured to compare.

In some embodiment, the biometric feature information is a fingerprint feature information, a palmprint feature information, a human face feature information, an iris feature information, a vein feature information or a voiceprint information.

An authentication method in accordance with a SIM card is provided. The authentication method in accordance with a SIM card includes the following steps. First, a biometric feature information is obtained by a sensor. Afterwards, a feature code is calculated according to the biometric feature information. Afterwards, the feature code to the SIM card is transmitted for comparing. Afterwards, a comparison result of the SIM card is obtained.

In some embodiment, the authentication method further includes the following steps after the biometric feature information is obtained by the sensor. First, a random number request is transmitted to the SIM card. Afterwards, a random number is received from the SIM card. Afterwards, the feature code transmitted to the SIM card for comparing includes the step of transmitting the feature code and the random number to the SIM card for comparing.

In some embodiment, the authentication method further includes the following steps, before a biometric feature information is obtained by the sensor. First, an authentication request of a server or an authentication request of an application is obtained. After the comparison result of the SIM card is obtained, the authentication method further includes the step. The comparison result is returned to the server or the application.

In some embodiment, the sensor is an under-screen fingerprint sensor comprising a coded mask, and the biometric feature information is a fingerprint feature information comprising the coded mask.

In some embodiment, the biometric feature information is a fingerprint feature information, a palmprint feature information, a human face feature information, an iris feature information, a vein feature information or a voiceprint information.

In the above authentication method in accordance with a SIM card is provided. The authentication method in accordance with a SIM card includes the following steps. First, a biometric feature information is obtained by a sensor. Afterwards, a feature code is calculated according to the biometric feature information. Afterwards, the feature code is stored by a SIM card writing module to a feature code storage area of the SIM card.

In some embodiment, further includes the following steps. First, a SIM card identification code is obtained by an internet. Afterwards, the SIM card identification code is stored by the SIM card writing module to the SIM card.

A device for authentication is provided in the present disclosure. The device for authentication includes a memory and a processor. The memory stores a computer program. The computer program achieves the steps of the authentication method when the computer program is executed by the processor.

A system for authentication is provided in the present disclosure. The system for authentication includes an electronic equipment and a SIM card. The electronic equipment includes a SIM card connecting module, a first sensor, a first memory and first processor. The first sensor is configured to obtain a biometric feature information. The first memory stores a first computer program. The first computer program achieves the steps of the authentication method when the first computer program executed by the first processor. The SIM card is configured to execute the steps of the authentication method.

In the above system for authentication, the electronic equipment includes a screen. The screen includes a non-opaque cover plate, a display panel and a coded mask. The first sensor is disposed at a reflected light path, and the reflected light path is formed by an optical line of display panel reflected by the non-opaque cover plate. The coded mask is disposed at a light path in front of the sensor. The coded mask is represented as a matrix by a matrix way. The matrix is a Dirac function after satisfying an autocorrelation operation.

In the above system for authentication further includes a writing device. The writing device includes a SIM card writing module, a second sensor, a second memory and a second processor. The second sensor is configured to obtain a biometric feature information. The second memory stores a second computer program. The second computer program achieves the steps of the authentication method when the second computer program is executed by the second processor. Compared to existing technology, the above technical solution is configured to store the feature code in the SIM card and use it for authentication. The noncrackable SIM card protects a security of biometric feature information. After replacing the device, just plug the SIM card into the new device to complete the authentication and initialization of the new device. Therefore, the above technical solution avoids the initial setup of the new device and make it easy to use.

DESCRIPTION OF THE PREFERRED EMBODIMENTS

In order to explain the technical content, structural features, achieved objectives, and effects of the technical solution in detail, specific embodiments are described below in conjunction with drawings.

Please refer to FIG. 1 to FIG. 6. An authentication method in accordance with a SIM (Subscriber Identification Module, also known as user identification) card is provided in the embodiment. The authentication method could be used in the SIM card and an electronic equipment including the SIM card. For example, the electronic equipment is a mobile phone. The following description uses a mobile phone as an example. The authentication method includes the following steps. The mobile phone obtains a biometric feature information by a sensor in step S101. The mobile phone calculates a feature code according to the biometric feature information in step S102. The feature code is transmitted to the SIM card for comparing in step S103. The SIM card receives the feature code of the biometric feature information in step S104. The SIM card is configured to compare the feature code of the biometric feature information and a feature code stored in the SIM card for obtaining a comparison result in step S105. The SIM card returns the comparison result in step S106. A comparison result of the SIM card is obtained in step S107. The biometric feature information is an original biometric data obtained by the sensor. The feature code is a series of data representing the biometric data. The series of data is obtained according to calculating the biometric data. The comparison of the data is generally to determine a degree of similarity. If the degree of similarity is greater than or equal to a certain threshold, the comparison of the data is considered similar. Thus, a successful comparison result is obtained (The successful comparison result indicates a biometric feature certification is passed.). If the degree of similarity is less than the certain threshold, the comparison of the data is not considered similar. Thus, a failed comparison result is obtained (The failed comparison result indicates the biometric feature certification is not passed.). The comparison of the SIM card is usually performed by a small program of the SIM card. According to the feature code stored in the SIM card and the feature code used for authentication and according to the noncrackable SIM card protecting the security of biometric feature information, just plug the SIM card into the new device to complete the authentication and initialization of the new device after replacing the device. Therefore, the above technical solution avoids the initial setup of the new device and make the new device easy to use.

Figure 2:
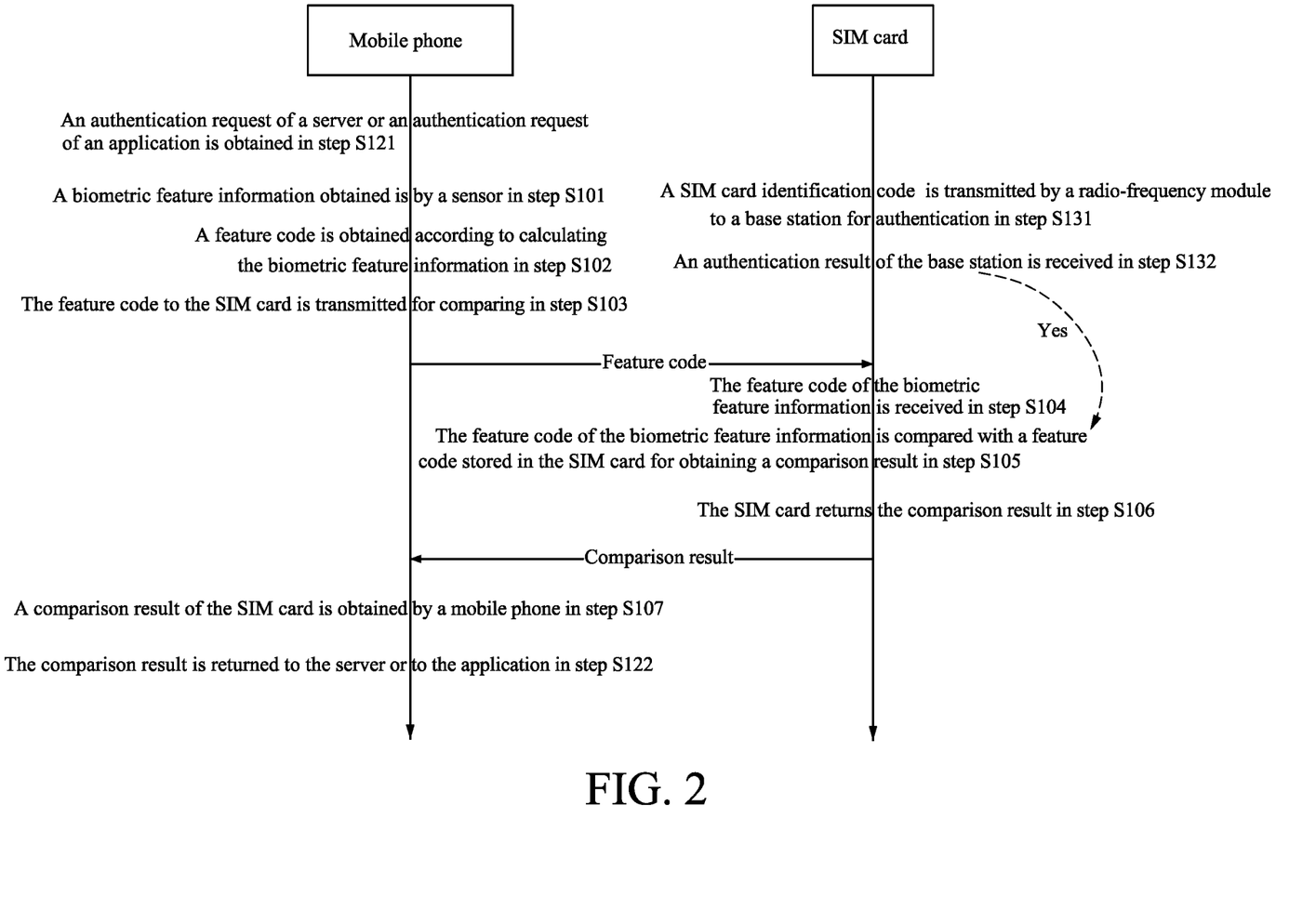
FIG. 2 illustrates another interaction flowchart of a SIM card and an electronic equipment in the present disclosure.

In order to achieve uniqueness of certification, the present disclosure also uses a random number to judge the authentication process. The authentication method further includes the steps. A random number request is transmitted to the SIM card in step S110. The SIM card receives a random number request in step S111. The SIM card returns a random number in accordance with the random number request in step S112. A random number is received from the SIM card in step S113. In step S103, that the feature code is transmitted to the SIM card for comparing includes the step. The feature code and the random number card is transmitted to the SIM for comparing. In step S104, that the SIM card receives the feature code of the biometric feature information further includes the steps. The SIM card receives a random number and the feature code of the biometric feature information. In step S105, that the SIM card is configured to compare the feature code of the biometric feature information and the feature code stored in the SIM card further includes the step. The SIM card compares the random number and the feature code of the biometric feature information and the random number and the feature code stored in the SIM card. The random code can guarantee one-time authentication to avoid repeated authentication. In order to be cracked, the feature code and the random number can be encrypted into an encrypted data by using a public key. Afterwards, the SIM card is decrypted by using the private key to get the random number and the feature code. During the comparison, the random number should be the last random number. If the random number is not the last random number, the authentication is failed. When the random number is the last random number and when comparing the feature codes, if the comparison result is greater than or equal to a certain threshold, the authentication is succeeded. If the comparison result is not greater than or equal to a certain threshold, the authentication is failed.

When the mobile phone is lost, generally reporting the loss of the SIM card is in order to prevent a data of the SIM card from being used. The SIM card cannot pass an authentication of the operator's base station and cannot make a call after the loss of the SIM card. The authentication method further includes the steps. The SIM card transmits a SIM card identification code through a radio-frequency module to a base station for authentication in step S131. The SIM card receives an authentication result of the base station in step S132. In step S105, if the authentication result is passed, the SIM card is configured to compare and if the authentication result is not passed, the SIM card is not configured to compare. Thus, if the loss of the SIM card is reported, the biometric feature information of the SIM card cannot be authenticated in order to ensure the security after the SIM card is lost.

Figure 1:
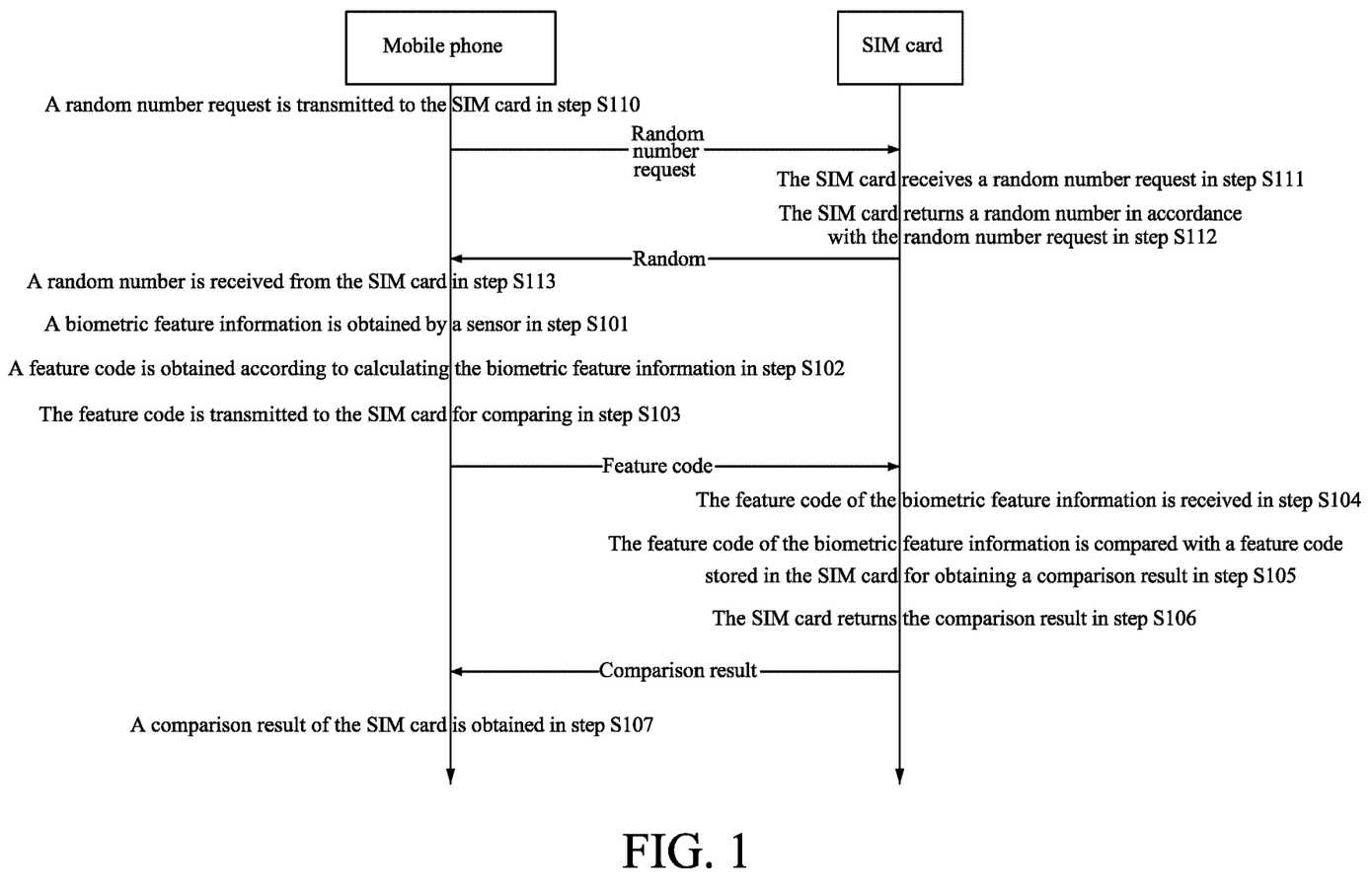
FIG. 1 illustrates an interaction flowchart of a SIM card and an electronic equipment in the present disclosure.

In actual use, an authentication of the biometric feature information is usually triggered by a request from a remote server or an application on the phone. After that, the authentication is completed by a system with the electronic equipment. The system of the electronic equipment obtains the biometric feature information and transmits it to the SIM card for authentication. The authentication method further includes step S121 before step S101, an authentication request of a server or an authentication request of an application is obtained in step S121. In other words, the server or the application is configured to verify the biometric feature information. After the comparison result of the SIM card is obtained in step S107, the authentication method further includes the step S122. The comparison result is returned to the server or to the application. Thus, the server or the application could achieve the authentication of the biometric feature information. In the above embodiment, the biometric feature information is a biometric feature information related to human characteristics. It could be a fingerprint feature information, a palmprint feature information, a human face feature information, an iris feature information, a vein feature information or a voiceprint information. In order to obtain this information, it should be collected by the sensor. Next, at the time of collection, that the human characteristics should be placed in an acquisition area of the sensor is good for the collection of the sensor.

In the above embodiment, the biometric feature information is a biometric feature information related to human characteristics. It could be a fingerprint feature information, a palmprint feature information, a human face feature information, an iris feature information, a vein feature information or a voiceprint information. In order to obtain this information, it should be collected by the sensor. Next, at the time of collection, that the human characteristics should be placed in an acquisition area of the sensor is good for the collection of the sensor.

Figure 5:
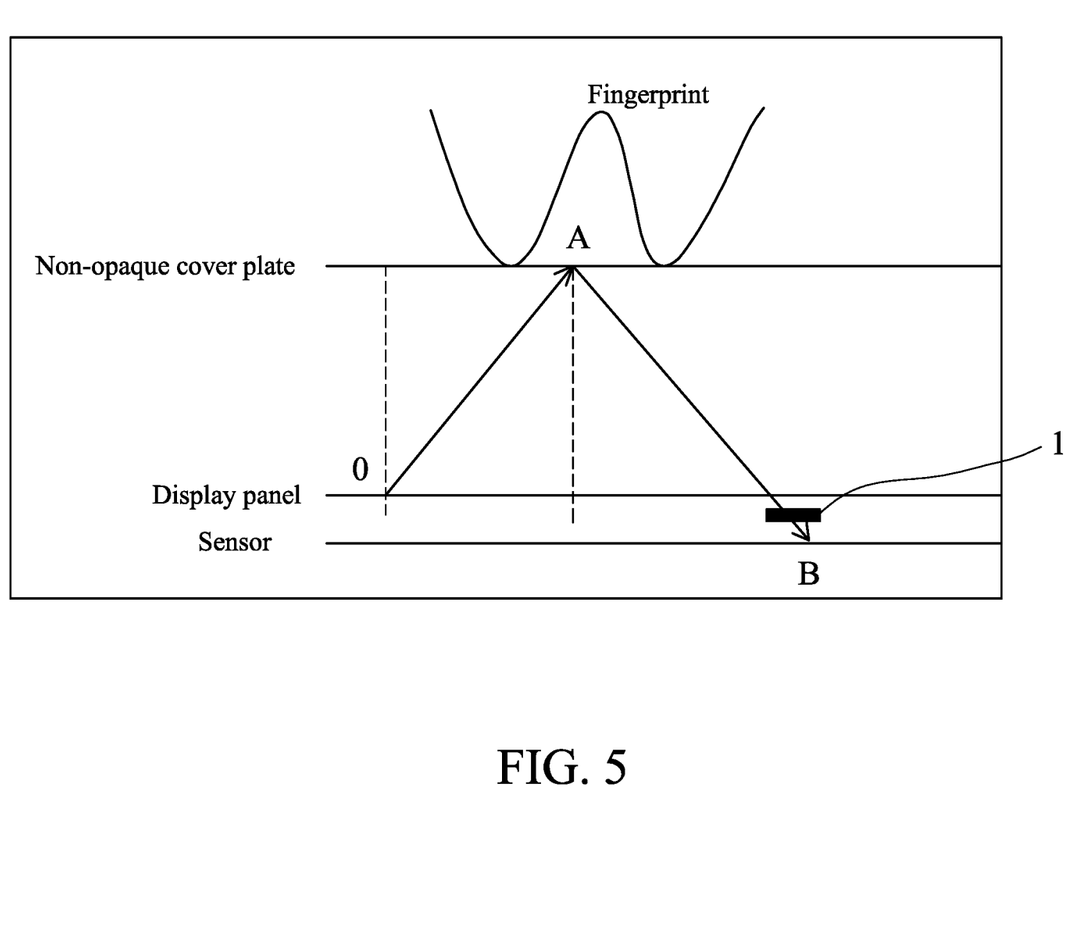
FIG. 5 illustrates a schematic diagram of a screen structure of an under-screen fingerprint sensor used by the present disclosure.

In a preferred embodiment, the biometric feature information is a fingerprint information, and the sensor is an under-screen fingerprint sensor. As shown in FIG. 5, a screen having an under-screen fingerprint sensor is provided, the screen includes a non-opaque cover plate, a display panel and a photoelectric sensor, and the display panel and the photoelectric sensor are disposed under a non-opaque cover. The non-opaque cover plate is used for transmitting light and protecting the display panel and such as a single-layer structure or a multi-layer structure. The single-layer structure is such as a glass cover plate or an organic non-opaque material cover plate, and the single-layer plate is also such as a cover plate having other functions, for example: a touch screen. The multi-layer structure is such as a multi-layer glass cover plate or a multi-layer organic non-opaque material cover plate or a combination of a glass cover plate and an organic non-opaque material cover plate. The photoelectric sensor is used to acquire the light intensity and includes a plurality of photosensitive units, the photoelectric sensor is such as separately disposed under the display panel or disposed on the display panel. As shown in FIG. 5, when a plurality of photosensitive units is disposed under the display panel and forms a photoelectric sensor panel, and the light can enter the photoelectric sensor through the gap between the pixels on the display panel. When disposed on the display panel, the photosensitive units can be disposed in a gap between the pixels of the display panel. The photoelectric sensor is disposed in the screen structure for acquiring image, such as image of a fingerprint or palm print. The non-opaque cover plate and the display panel must be connected by filling optical adhesive to avoid the air affecting the reflection of the light. The refractive index of the optical adhesive should be smaller than the refractive index of the non-opaque cover plate to avoid total reflection between the optical adhesive and the non-opaque cover plate. The display panel is used for illumination and may be a display panel for displaying an image, such as an OLED panel, and the pixels of the display panel may be elements of an OLED pixel array.

Figure 6:
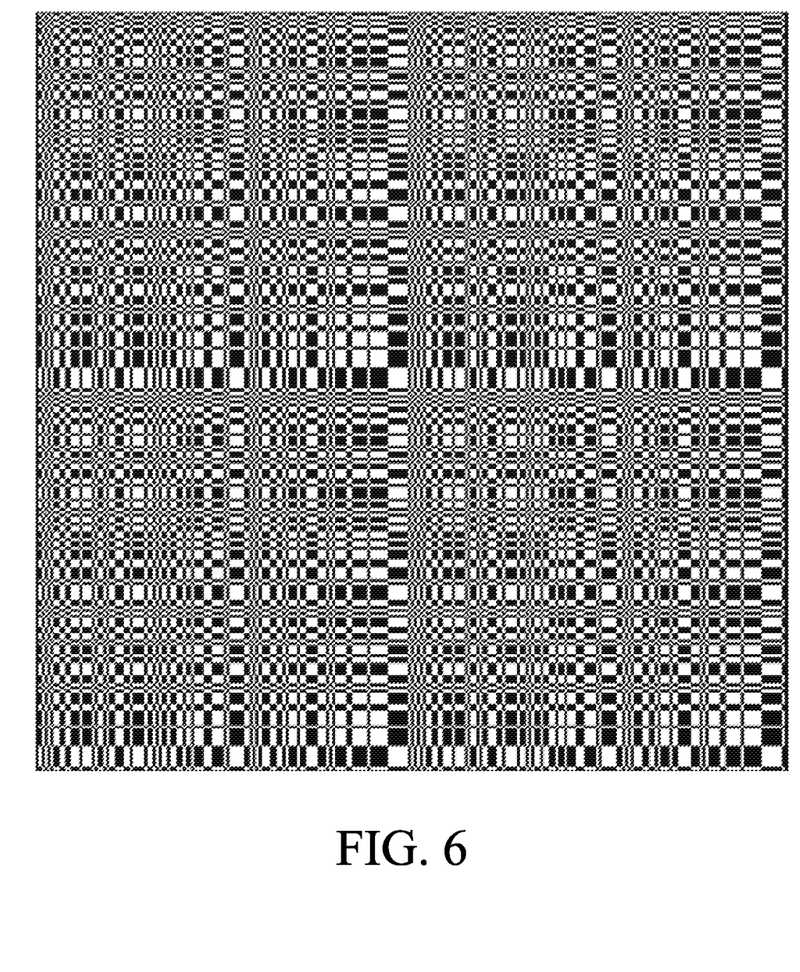
FIG. 6 illustrates a schematic diagram of a coded mask in accordance with an embodiment of the present disclosure.

In order to achieve encryption of the fingerprint information which may be encrypted by physical way. Specifically, the sensor is an under-screen fingerprint sensor including a coded mask 1. The biometric feature information is a fingerprint feature information including the coded mask. The coded mask is a structure with hollow and occlusion. The structure can block part of the light. As shown in FIG. 6, the coded mask is represented as a matrix by a matrix way. The matrix is a Dirac function after satisfying an autocorrelation operation. The coded mask can cover all the sensor or parts of the sensor for blocking part of the light. Next, the system needs to store a decoding information corresponding to the coded mask. After a fingerprint image data dealt with by the coded mask is obtained, the fingerprint image data can decode to obtain a correct fingerprint image according to the decoding information and the fingerprint image data. Next, the feature code of the fingerprint image to the SIM card is calculated and transmitted for authentication. Through the processing of the coded mask, the fingerprint information obtained in the system is not the original fingerprint information, which guarantees the security of the fingerprint.

Figure 4:
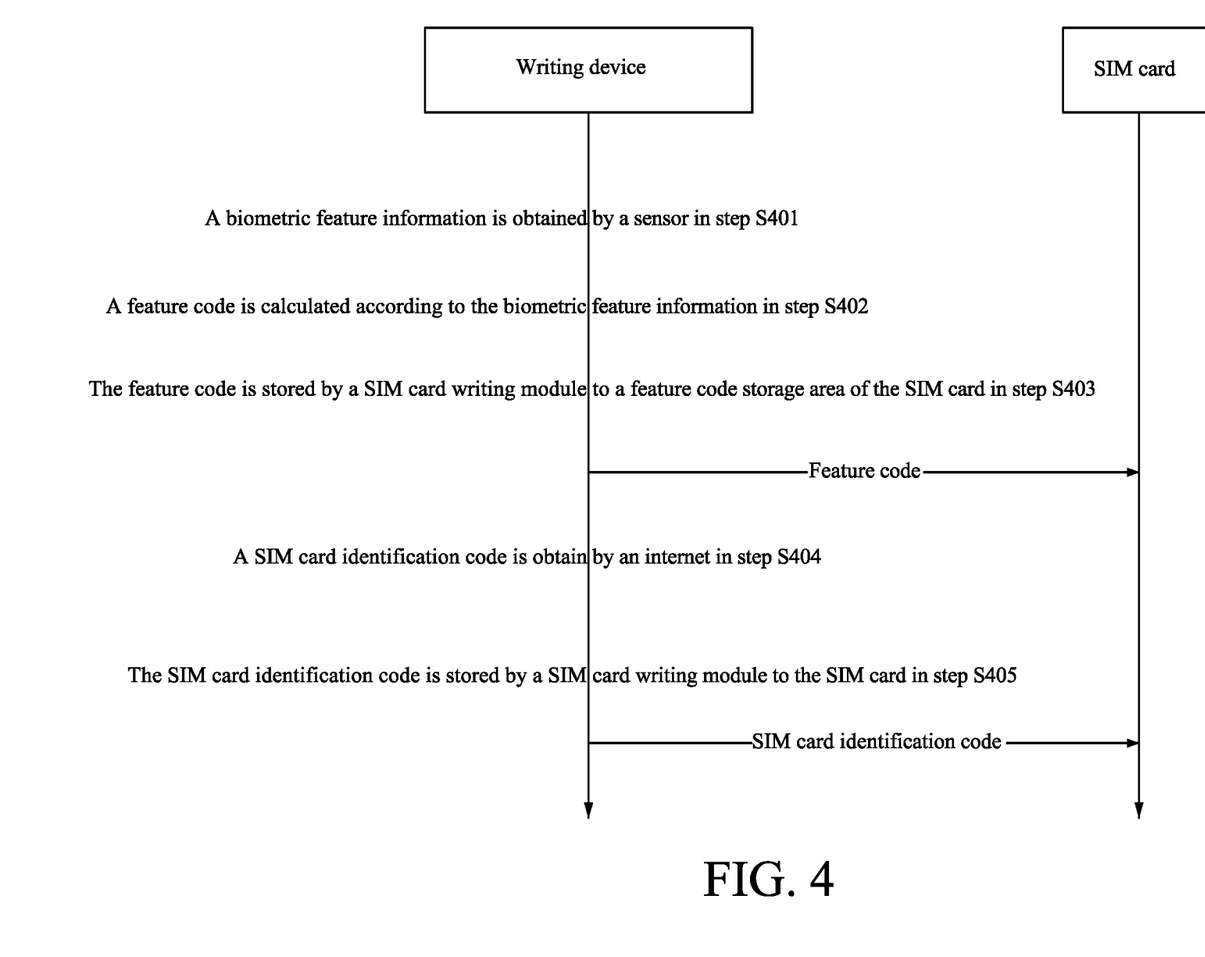
FIG. 4 illustrates an interaction flowchart of the SIM card and a writing device in the present disclosure.

Usually, when you first get the SIM card, the SIM card is a blank card which does not store any feature information. The SIM card needs to be initialized, which is helpful for the comparison of the SIM cards. As shown in FIG. 4, an authentication method in accordance with a SIM card is provided in the present disclosure. The authentication method could be used an electronic equipment (e.g., computer) including the SIM card writing module and the sensor. The authentication method includes the following steps. A biometric feature information is obtained by a sensor in step S401. A feature code is calculated according to the biometric feature information in step S402. The feature code is stored by a SIM card writing module to a feature code storage area of the SIM card in step S403. This operation is generally implemented by the operator. A specialized SIM card writing module achieves to write the SIM card. Ordinary users do not have the ability to write and cannot rewrite the SIM card. Thus, the SIM card has been initialized. Next, placing the SIM card in the mobile phone to achieve an authentication of the biometric feature information.

Generally, an operation of authentication information on the SIM card is also needed in order to activate the SIM card. The authentication method further includes the following steps. A SIM card identification code is obtained by an internet in step S404, and the SIM card identification code is transmitted to an operator base station for authentication, and if the authentication is passed, the users could make a call. When the SIM card identification code is invalidated by an operator (If the user reports a loss or logs off.), the authentication is not passed. The SIM card identification code is stored by a SIM card writing module to the SIM card in step S405. In this way, when the user installs the SIM card in the mobile phone, the authentication of the SIM card can be realized automatically.

A device for authentication is provided in the present disclosure. The device for authentication includes a memory and a processor. The memory stores a computer program. The computer program achieves the steps of the authentication method when the computer program is executed by the processor. When the device for authentication of the present disclosure executes different methods, it may be different equipment. For example, electronic devices (e.g., mobile phones), writing devices (e.g., computers), or SIM cards.

Figure 3:
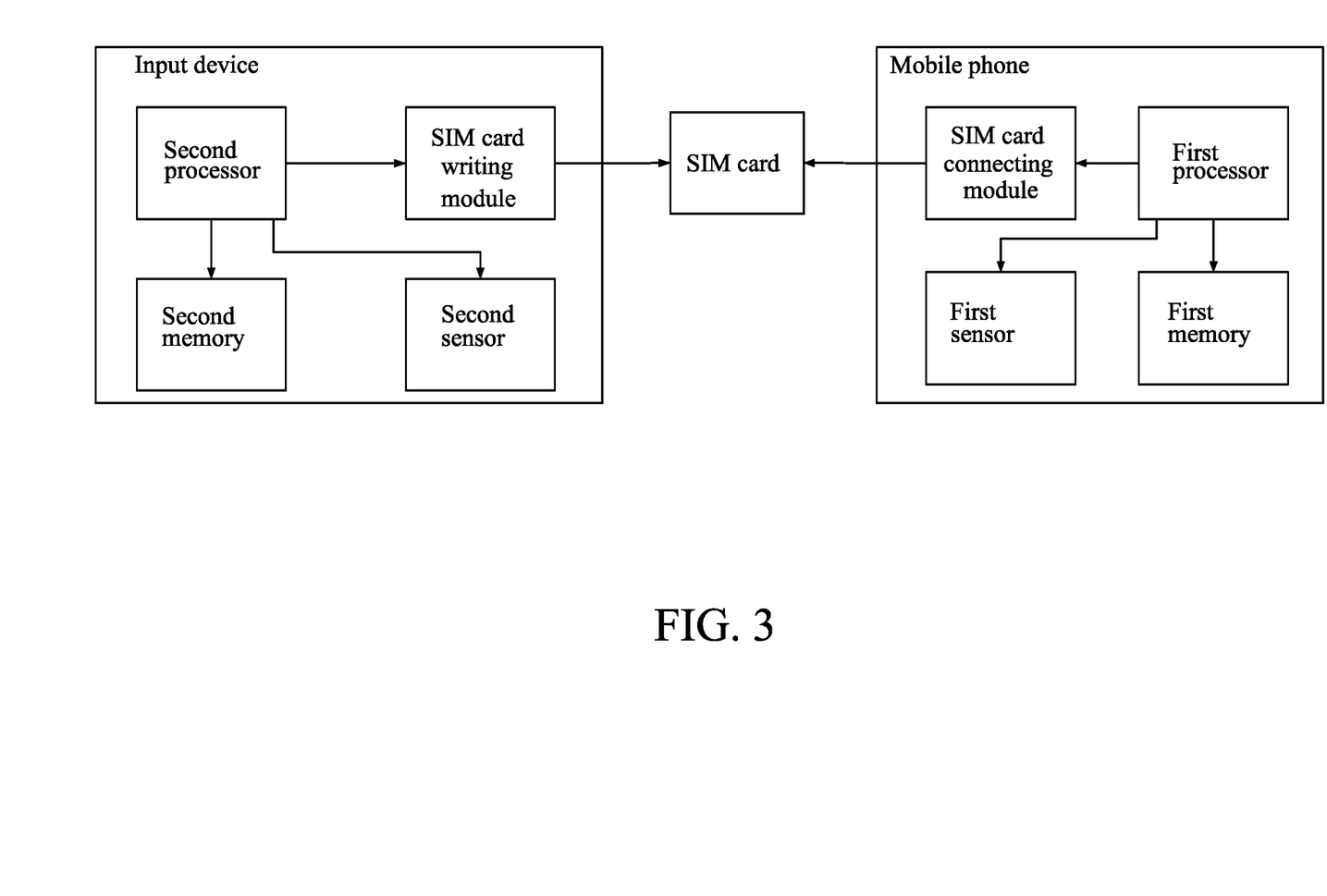
FIG. 3 illustrates a schematic diagram of a system for authentication in the present disclosure.

A system for authentication is provided in the present disclosure. As shown in FIG. 3, the system for authentication includes an electronic equipment and a SIM card. The electronic equipment includes a SIM card connecting module, a first sensor, a first memory and first processor. The first sensor is configured to obtain a biometric feature information. The first memory stores a first computer program. The first computer program achieves the steps of the authentication method when the first computer program executed by the first processor. The SIM card is configured to execute the steps of the authentication method. Therefore, an authentication of the biometric feature information can be realized by the system for authentication.

In some embodiment, the biometric feature information is a fingerprint information, and the first sensor is an under-screen fingerprint sensor. The electronic equipment includes a screen. As shown in FIG. 5, the screen includes a non-opaque cover plate, a display panel and a coded mask. The first sensor is disposed at a reflected light path, and the reflected light path is formed by an optical line of display panel reflected by the non-opaque cover plate. The coded mask is disposed at a light path in front of the sensor. The coded mask is represented as a matrix by a matrix way. The matrix is a Dirac function after satisfying an autocorrelation operation. The matrix way is that the coded mask is split into small squares. Next, marking occluded squares is as 1 and marking hollow squares is as 0. A matrix is written according to the locations of occluded squares and the locations of the hollow squares.

The system for authentication further includes a writing device for initializing the SIM card. The writing device includes a SIM card writing module, a second sensor, a second memory and a second processor. The second sensor is configured to obtain a biometric feature information. The second memory stores a second computer program. The second computer program achieves the steps of the authentication method when the second computer program is executed by the second processor.

Although the above embodiments have been described, those skilled in the art can make other changes and modifications to these embodiments once they have learned the basic inventive concept. Therefore, the above descriptions are only the embodiments of the present disclosure, and thus does not limit the patent protective scope of the present disclosure. Similarly, any equivalent structure or equivalent process transformation made by using the present specification and the drawings, or directly or indirectly applied to other relevant technical fields, shall be included in the patent protective scope of the present disclosure.

What is claimed is:

1. A method for authentication in accordance with an SIM card comprising:
   a subscriber identity module (SIM) card receiving a random number request;
   the SIM card returning a random number in accordance with the random number request;
   the SIM card receiving the random number and a feature code of a biometric feature information;
   the SIM card comparing the random number and the feature code of the biometric feature information with a random number and a feature code stored in the SIM card for obtaining a comparison result; and
   the SIM card returning the comparison result.

2. The method for authentication in accordance with the SIM card of claim 1, wherein the SIM card comparing the feature code of the biometric feature information with the feature code stored in the SIM card comprises:
   the SIM card transmitting an SIM card identification code through a radio-frequency module to a base station for authentication;
   the SIM card receiving an authentication result of the base station; and
   if the authentication result is passed, the SIM card is configured to perform the comparing, and if the authentication result is not passed, the SIM card is configured to not perform the comparing.

3. The method for authentication in accordance with the SIM card of claim 1 wherein the biometric feature information comprises a fingerprint feature information, a palmprint feature information, a human face feature information, an iris feature information, a vein feature information, or a voiceprint information.

4. A method for authentication in accordance with a subscriber identity module (SIM) card, comprising:
   obtaining a biometric feature information by a sensor;
   transmitting a random number request to the SIM card;
   receiving the random number returned by the SIM card in accordance with the random number request;
   calculating a feature code according to the biometric feature information;
   transmitting the feature code and the random number to the SIM card for comparing; and
   obtaining a comparison result of the SIM card.

5. The method for authentication in accordance with the SIM card of claim 4, wherein before a biometric feature information is obtained by the sensor, the method for authentication further comprises:
   obtaining an authentication request of a server or an authentication request of an application;

after the comparison result of the SIM card is obtained, the method for authentication further comprises:
returning the comparison result to the server or to the application.

6. The method for authentication in accordance with the SIM card of claim 4, wherein the sensor is an under-screen fingerprint sensor comprising a coded mask, the biometric feature information is a fingerprint feature information comprising the coded mask information.

7. The method for authentication in accordance with the SIM card of claim 4, wherein the biometric feature information is a fingerprint feature information, a palmprint feature information, a human face feature information, an iris feature information, a vein feature information or a voiceprint information.

8. A system for encryption and authentication comprising an electronic equipment and a subscriber identity module (SIM) card, the electronic equipment comprising a SIM card connecting module, a sensor of the electronic equipment, a first memory, and a first processor, wherein the sensor of the electronic equipment is configured to obtain a biometric feature information, the first memory is stored with a first computer program, the first computer program is adapted to achieve the method for authentication of claim 4 when the first computer program is executed by the first processor, and the SIM card is configured to execute the method for authentication of:
the SIM card receiving a feature code of a biometric feature information;
the SIM card comparing the feature code of the biometric feature information with a feature code stored in the SIM card for obtaining a comparison result; and
the SIM card returning the comparison result.

9. The system for encryption and authentication of claim 8, wherein the electronic equipment comprises a screen, the screen comprises a non-opaque cover plate, a display panel and a coded mask; the sensor of the electronic equipment is configured to receive light emitted from the display panel and reflected by the non-opaque cover plate and filtered by the coded mask, the coded mask is represented as a matrix, the matrix being a Dirac function after satisfying an auto-correlation operation.

10. The system for encryption and authentication of claim 8 further comprising a writing device, the writing device comprising a SIM card writing module, a sensor of the writing device, a second memory, and a second processor, wherein the sensor of the writing device is configured to obtain a biometric feature information, the second memory is stored with a second computer program, when the second computer program is executed by the second processor the second computer program is configured to achieve the method for authentication of:
obtaining a biometric feature information by the sensor of the electronic equipment and the sensor of the writing device;
calculating a feature code according to the biometric feature information;
storing the feature code by an SIM card writing module to a feature code storage area of the SIM card;
obtaining an SIM card identification code by an internet; and
storing the SIM card identification code by the SIM card writing module to the SIM card.

11. A method for authentication in accordance with a subscriber identity module (SIM) card comprising:
obtaining a biometric feature information by a sensor;
calculating a feature code according to the biometric feature information;
storing the feature code by a SIM card writing module to a feature code storage area of the SIM card;
obtaining a SIM card identification code by an internet;
transmitting a random number request to the SIM card by the internet;
receiving a random number returned by the SIM card by to the internet in accordance with the random number request;
storing the SIM card identification code by the SIM card writing module at the SIM card; and
transmitting the feature code and the random number to the SIM card by the internet for comparing.

* * * * *